United States Patent Office 3,586,661
Patented June 22, 1971

3,586,661
1,2-BUTADIENE COPOLYMERS
Chester L. Parris, Morris Plains, and Leo S. Rieve, Schooley's Mountain, N.J., assignors to Allied Chemical Corporation, New York, N.Y.
No Drawing. Filed Aug. 4, 1969, Ser. No. 847,415
Int. Cl. C08d 3/02, 1/14
U.S. Cl. 260—85.3          7 Claims

ABSTRACT OF THE DISCLOSURE

Butadiene copolymers of melting point 30°–120° C. with the major proportion of the butadiene content being combined in the copolymer in the 1,2 form. The comonomer is a non-crystalline hydrocarbon having at least five carbon atoms in the molecule and having a vinyl double bond conjugated with an olefinic double bond. The process of making employs as catalyst a complex of a cobalt compound with butadiene or open chain butadiene dimer and with an organo metallic compound of zinc, lithium or aluminum; and a catalyst modifier of fumaric acid ester or maleic acid ester. The copolymers are formulated to molding compounds which can be cured rapidly and used in transfer molding.

BACKGROUND OF THE INVENTION

The invention relates to 1,2-butadiene copolymers, i.e. copolymers wherein one constituent is the divalent butadiene unit, combined in the copolymer principally in the 1,2 form, i.e. the form which provides a vinyl group pendant from the polymer chain probably in syndiotactic form, i.e. successive vinyl groups alternate in position between the two possible stereoisomeric positions (d- and l-) upon successive segments of the chain. Thus the major proportion of the butadiene content of the copolymer is combined in the form of the units:

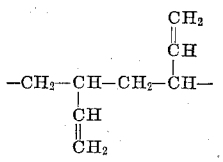

The second essential constituent of the subject copolymers is a hydrocarbon with at least five carbon atoms in the molecule, non-crystalline at 25° C., and having a vinyl group and an olefinic double bond conjugated with the vinyl double bond.

Homopolymers of 1,2-butadiene are known, including the syndiotactic and the isotactic forms—Montecatini British Patent 835,752 published May 25, 1960, and Montecatini British Patent 854,615 published Nov. 23, 1960. These known homopolymers are relatively high melting, having melting points of about 154° C. and 124° C. respectively when in purified form. These homopolymers are useful in molding compositions; but their high melting point makes them difficult to process in that temperatures higher than those attainable by hot water or steam are required for blending these homopolymers with other materials, such as curing agents employed in molding compositions. In British Patent 854,615 above cited, pertaining to isotactic 1,2-polybutadiene, copolymers with styrene are mentioned curable at 80°–100° C. with an organic peroxide (page 4, lines 36–43).

SUMMARY OF THE INVENTION

Copolymers in accordance with the invention, above described, overcome the above noted difficulties of processing to obtain molding composition and the like, by virtue of their having melting points (as determined by differential scanning calorimeter) within the temperature broadly between about 30° C. and about 120° C.; and these copolymers maintain the high rate of curability of 1,2-butadiene homopolymers in the presence of peroxy curing agents. Moreover the copolymers of the present invention have high flow characteristics so that they will readily fill an intricate mold. Furthermore the temperatures suitable for curing molding compositions of these copolymers with peroxy curing agents are relatively high (at least 120° C. and suitably 160°–190° C.) so that molding compositions thereof can be formulated without premature cure and can be charged in the fused state to a mold, e.g. as in transfer molding, and thereafter can be cured in the mold.

The process of producing the copolymers of this invention involves using as catalyst a complex of a cobalt compound together with an organo metallic compound of zinc, lithium or aluminum and together with a fumaric acid ester or maleic acid ester, particularly an alkyl ester.

PREFERRED EMBODIMENTS

In accordance with a particular feature of the invention, the comonomer employed to produce the copolymer of the invention together with butadiene is an open-chain butadiene dimer such as in particular 3-methyl-1,trans-4,6-heptatriene. Crystalline copolymers of butadiene in the 1,2 form with such butadiene dimers, it has been found, have substantially lower melting points as compared to the crystalline 1,2 butadiene homopolymers, yet still produce a granular, non-sticky product. The product is readily handled and processed in blending operations including dry blending and blending under shear with other ingredients of a composition such as a molding composition.

Other specific butadiene dimers which can be used are 1,3,6-octatriene; 1,3,7-octatriene; and 3-methyl-1,3,6-heptatriene. Also suitable are other vinyl hydrocarbons having a double bond conjugated with the vinyl bond and containing 5–12 carbon atoms in the molecule such as isoprene, piperylene and myrcene.

For production of the copolymers of the invention, it is preferred to make up a solution in hydrocarbon solvent of the cobalt compound together with say about 1–10 times its weight of butadiene or butadiene dimers. Then the organo metallic compound is added, preferably in proportions of about 1–10 mols per mol of the cobalt compound. The cobalt compound should be soluble in the reaction medium. A particularly suitable cobalt compound is tris-acetylacetonate; and particularly suitable organo metallic compounds are triethylaluminum and triisobutylaluminum. This catalyst mixture, after allowing time for complex formation between the ingredients as indicated by color change, is mixed with the fumaric ester or maleic ester which is preferably in proportion of about 1–3 mols per mol of cobalt compound. Particularly suitable esters are dialkyl fumarates having $C_1$–$C_8$ alkyl groups.

The copolymerization is then conducted in the resulting solution by supplying the comonomers at temperatures from about 0° C. to about 100° C., especially 10°–70° C. These operations are conducted under a dry nitrogen atmosphere.

The catalyst is deactivated and unreacted materials are extracted by use of a low boiling alcohol such as isopropanol, suitably containing acid; and the product is washed, suitably with methanol. The wash liquid should contain an antioxidant such as an aromatic amine or a phenolic antioxidant to protect the isolated polymer during subsequent handling.

The preferred copolymers thus produced are crystalline, have melting points within the range between about 50° C. and about 120° C., and have vinyl double bonds amounting to at least 70% of the total double bonds as shown by infrared examination.

EXAMPLES

The examples which follow are illustrative of the invention and of the best mode now contemplated for carrying out the same; but the invention is not to be considered as limited to all details of the examples.

Example 1

A clean, dry 1-gallon autoclave, previously purged with dry nitrogen was charged with 1.75 liters of cyclohexane in which 10 ml. of diethyl fumarate had been dissolved. Forty milliliters of a mixture of open-chain butadiene dimers was then added. The mixture was principally 3-methyl-1,trans-4,6-heptatriene, prepared according to the method T. Saito, Y. Uchida and A. Misono—see Kagyo Kagaku Zasshi (Japan), vol. 66 (8) of 1963, pp. 1094–1099 and 1099–1103; Chem. Abs., vol. 62 of 1965 col. 8986 f,h.

A catalyst mixture was prepared by suspending 1.52 gm. (0.0042 mol) cobalt tris-(acetylacetonate) in 250 ml. cyclohexane and 10 ml. (about 8 gm.) of the butadiene dimers. A solution of 0.0105 mol of triethylaluminum in cyclohexane was then added with stirring.

After 0.5 hour the reddish-brown catalyst solution was charged to the autoclave. Liquid butadiene was then added in 100 g. portions at half-hour intervals until a total of 1000 g. had been charged. A dry nitrogen atmosphere was maintained throughout these and the succeeding operations through deactivation. The temperature was held at about 15° C. and the pressure was not over 21 p.s.i.g. After monomer addition was complete the mixture was stirred overnight, then heated at 50° C. for 2 hours. The autoclave was vented and the contents was mixed under dry nitrogen with 2 liters of isopropanol containing 50 ml. conc. hydrochloric acid. The solid product obtained was filtered, washed thoroughly with methanol containing 0.5% of a commercial hindered polyphenol ("Irganox" 1076). The dry product had melting point (differential scanning calorimeter) of about 116°–118° C. The melting point and the method of preparation indicate the product to be a 1,2-polybutadiene copolymer with the open-chain butadiene dimer, wherein the butadiene is combined in the copolymer principally in the syndiotactic 1,2 form. The yield based on the weight of the starting materials (i.e. without taking account of unreacted butadiene) was about 75%. At least 90% of the double bonds of the product are vinyl double bonds, per infrared examination.

When it was attempted to copolymerize a small proportion of styrene with butadiene using the above catalyst and essentially the same procedure, only the butadiene polymerized and the styrene did not polymerize.

Example 2

The procedure of Example 1 was repeated except that myrcene was employed as the comonomer in place of the butadiene dimer mixture.

Example 3

A catalyst mixture was prepared by suspending 0.326 gm. (0.9 mol) of cobalt tris-(acetylacetonate) in 40 ml. heptane containing 3.5 ml. (2.3 gm.) of butadiene, then adding 2.6 mols of triisobutyl aluminum with agitation. After 20 minutes 1.7 mols of diethyl fumarate was added and the reddish-brown solution was stirred 20 minutes longer.

A clean, dry 12 oz. pressure bottle was charged with 23.6 gm. (0.437 mol) butadiene, 1.36 gm. (0.02 mol) piperylene and 100 ml. heptane. The catalyst mixture was added via a hypodermic syringe and the reactor held at room temperature by external cooling for 1.5 hrs., after which time the bottle contents were very viscous. The product was treated with acidified methanol, filtered, washed, and dried to yield 25.2 g. slightly tan powder. The infrared spectrum showed enhanced absorbance at 1380 cm.$^{-1}$ indicative of the methyl group derived from the piperylene. Thermal analysis showed that the material was amorphous and low melting. The yield based on the weight of the starting materials calculates to 92% of theory.

Example 4

A catalyst mixture, prepared as in Example 3, was added to a solution, in 100 ml. heptane, of 6.8 gm. (0.1 mol) isoprene and 8.1 gm. (0.15 mol) butadiene contained in a clean, dry pressure bottle filled with dry nitrogen. After 15 minutes an additional 6.8 gm. isoprene was added. Additional portions of isoprene were added at 15 minute intervals until a total of 34 gm. (0.5 mol) had been charged. After agitation overnight the product was processed with acidified alcohol in the usual manner. There was obtained 28.7 gm. of material whose infrared spectrum showed enhanced absorbance at 1380 cm.$^{-1}$, indicative of the methyl group, and at 830$^{-1}$, indicative of the isopropenyl group, derived from the isoprene moiety. The characteristic vinyl bonds at 910 cm.$^{-1}$ and 990 cm.$^{-1}$ showed the presence of the butadiene moiety. The yield based on the weight of the starting materials calculates to 68% of theory.

Example 5

In a sigma blade mixer was dry blended 19 parts of a syndiotactic 1,2-butadiene copolymer of Example 1 (M.P. 116°–118° C.), 1 part of diallyl phthalate prepolymer ("Dapon" 35 from FMC Corporation), 0.2 part of vinyl silane (coupling agent for glass), 1 part of di-alpha-cumyl peroxide, 0.5 part of zinc stearate and 78.3 parts of finely divided silica filler. The blending was carried out for 10 minutes to insure adequate mixing. No heat was applied.

The charge was transferred to a roll mill which had a front roll temperature of 95°–100° C. and rear roll temperature of 75°–80° C. The charge quickly "banded" on the mill. Mixing was conducted for only 1½ minutes, after which time the composition was sheeted off and allowed to cool. The non-tacky sheet could be broken into granules which do not sinter at room temperature. Two pieces pressed together between the fingers will not stick.

Compression molding of this compound at about 150° C. for 1 minute under force of 10,000 p.s.i. gave test specimens with a heat distortion temperature (ASTM Test D–648) of about 260° C., a flexural strength of 8,200 p.s.i. and a flexural modulus of $1.09 \times 10^{-6}$ p.s.i. (both by ASTM Test D–790 using Type I samples).

Example 6

The copolymer of Example 1 (20 parts) was compounded with 80 parts of finely divided silica filler and 5 parts of di-alpha-cumyl peroxide as curing agent, using essentially the procedure of Example 5. The resulting granular molding composition was molded by a transfer molding technique, as follows:

A preform was made by compressing the material and was placed in the heated chamber of the transfer molding apparatus. Then the chamber was closed and pressure was applied by a plunger to drive the fused composition from the chamber into a heated spiral mold, heated to temperature to cure the composition. The length to which the spiral is filled during the standard time of the molding cycle, e.g. 2 minutes, is a measure of flowability of the composition.

This molding composition was also compression molded; and the deflection under standard loading, and hardness of the test bar obtained, were determined. Lower figures for deflection and higher figures for hardness correspond to higher degrees of cure. The table below sets out the data thus obtained upon (1) the composition using the copolymer of Example 1; and (2) a comparison molding composition, subjected to the same procedures (except for blending temperatures), and differing only in that syndiotactic 1,2-polybutadiene homopolymer was used therein instead of the Example 1 copolymer. The front roll temperature required for preparing the comparison molding composition was about 120° C.; and to get a satisfactory blend required repeatedly removing the sheeted out composition and passing it endwise in rolled up form again through the mill to form a sheet again.

TABLE (1) Molding compound of the invention:
Flowability (cure at 149° C.)—17 inches
Deflection (cure at 149° C. 4 mins.)—61 mm.
Hardness by Barcol test—cure [1]:
  1 min.—67
  2 mins.—69
  3 mins.—70
  5 mins.—72
(2) Comparison molding composition:
Flowability—1 inch
Deflection—56 mm.
Hardness:
  1 min.—69
  2 mins.—70
  3 mins.—70
  5 mins.—71

[1] All at 177° C.

The above data show that a molding compound based on the copolymer of the invention can readily be formulated at temperatures attainable with hot water or low pressure steam; and the resulting molding compound cures rapidly, similarly to 1,2-polybutadiene homopolymer. (The differences of 5 units in the deflection data and 1 or 2 units in the hardness data are not significant.) Moreover the molding compound of the invention has very good flowability, which is not found in the comparison molding compound.

Procedure A.—Following is the detailed procedure used to prepare open chain butadiene dimer employed in Example 1 above.

Three ml. of butadiene was condensed into a pressure bottle previously flushed with nitrogen and then with butadiene. A solution of 0.0035 mol of cobalt (III) acetylacetonate in benzene was then charged followed by 0.0105 mol triisobutylaluminum. The catalyst mixture was then transferred to a 2000 ml. autoclave containing 700 ml. benzene, previously flushed with nitrogen; and 4 mols (320 ml.) liquid butadiene was then added in small portions over a period of about one hour. After 16 hours, the mixture was heated at 50° C. for 8 hours and then cooled to room temperature.

Acidified isopropyl alcohol was added to deactivate the catalyst. Water was added and the organic phase was separated and concentrated by evaporating benzene therefrom. The residue was distilled; 45 gm. of yellow oil was obtained. B. P. 100°–115° C. (760 mm.). This oil was shown by infrared analysis to be a mixture of open chain butadiene dimers, in particular 3-methyl-1, trans-4,6-heptatriene and 1,3,6-octatriene.

The invention claimed is:

1. A butadiene copolymer having melting point within the range between about 30° C. and about 120° C. wherein the essential constituents are (1) a butadiene moiety, the major proportion of the butadiene content being combined in the copolymer in the 1, 2 form; and (2) a moiety of at least one hydrocarbon having from five to twelve carbon atoms in the molecule, which hydrocarbon is noncrystalline at 25° C. and has a vinyl group and an olefinic double bond conjugated with the vinyl double bond.

2. Copolymer of claim 1 wherein the butadiene moiety is the major constituent the copolymer melting point is within the range between 50° C. and 120° C.; and at least 70% of the double bonds of the copolymer are vinyl double bonds.

3. Copolymer of claim 2 wherein the minor essential constituent is a moiety of an open chain butadiene dimer.

4. Copolymer of claim 3 wherein the minor essential constituent is a moiety principally of 3-methyl-1, trans-4,6-heptatriene.

5. In a molding composition comprising a hydrocarbon polymer with high content of vinyl groups and a curing agent for said polymer, the improvement which comprises employing as said polymer the butadiene copolymer of claim 3.

6. In a process of copolymerizing butadiene, the improvement for combining the major proportion of the butadiene content in the copolymer in 1, 2 form, which comprises utilizing as comonomer, at least one hydrocarbon having 5–12 carbon atoms in the molecule, being noncrystalline at 25° C., and having a vinyl group and an olefinic double bond conjugated with the vinyl double bond; and utilizing as copolymerization catalyst a complex of a cobalt compound with at least one member of the group consisting of butadiene and open chain butadiene dimers and with an organo metallic compound of zinc, lithium or aluminum; and utilizing as catalyst modifier a fumaric acid ester or maleic acid ester.

7. Process of claim 6 wherein said catalyst modifier is a dialkyl fumarate having $C_1$–$C_8$ alkyl groups.

References Cited

UNITED STATES PATENTS

| | | | |
|---|---|---|---|
| 2,583,420 | 1/1952 | Garber et al. | 260—85.3 |
| 3,244,678 | 4/1966 | Tocker | 260—85.3 |
| 3,317,496 | 5/1967 | Natta et al. | 260—88.2 |

JAMES A. SEIDLECK, Primary Examiner

R. A. GAITHER, Assistant Examiner

U.S. CL. X.R.

260—82.1, 84.1